United States Patent [19]

Engle

[11] 4,386,529

[45] Jun. 7, 1983

[54] METHOD AND MEANS FOR IMPROVING VIDEO DISPLAY IMAGE

[75] Inventor: Gary L. Engle, Fair Oaks, Calif.

[73] Assignee: General Electric Company, Rancho Cordova, Calif.

[21] Appl. No.: 290,851

[22] Filed: Aug. 7, 1981

[51] Int. Cl.³ .......................................... G01N 29/00
[52] U.S. Cl. ........................................ 73/606; 358/112
[58] Field of Search ................ 73/606, 607, 618, 620; 367/7, 11; 358/112, 106, 138, 133; 360/10.1; 128/660

[56] References Cited

U.S. PATENT DOCUMENTS

| | | | |
|---|---|---|---|
| 2,921,124 | 1/1960 | Graham | 358/138 |
| 4,172,386 | 10/1979 | Cribbs et al. | 73/618 |
| 4,204,433 | 5/1980 | Cribbs et al. | 73/620 |
| 4,236,221 | 11/1980 | Cribbs et al. | 358/112 |
| 4,310,907 | 1/1982 | Tachita et al. | 358/112 |

*Primary Examiner*—Stephen A. Kreitman
*Attorney, Agent, or Firm*—Flehr, Hohbach, Test, Albritton & Herbert

[57] ABSTRACT

An improved still or frozen picture is provided in an ultrasonic sector scanner by generating and displaying two frames. The first frame is identical to the frame generated for dynamic real-time display. The second frame is generated from vectors lying intermediate vectors of the first frame with the same reflected signal data applied thereto. Accordingly, the pixel data is doubled in the still or frozen picture.

3 Claims, 4 Drawing Figures

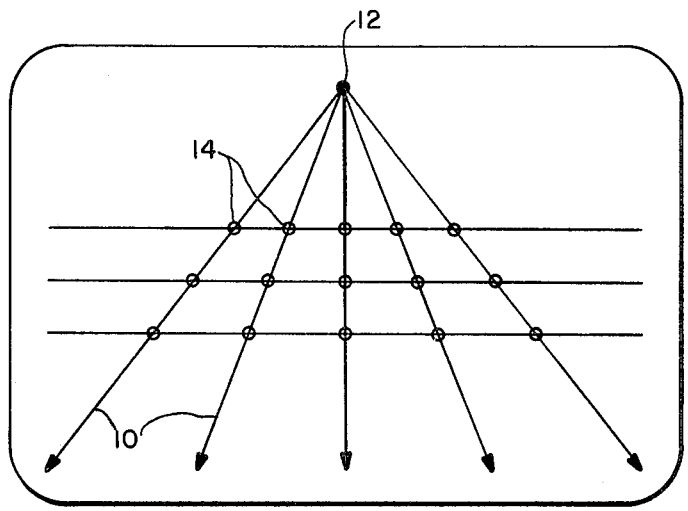
FIG.—1
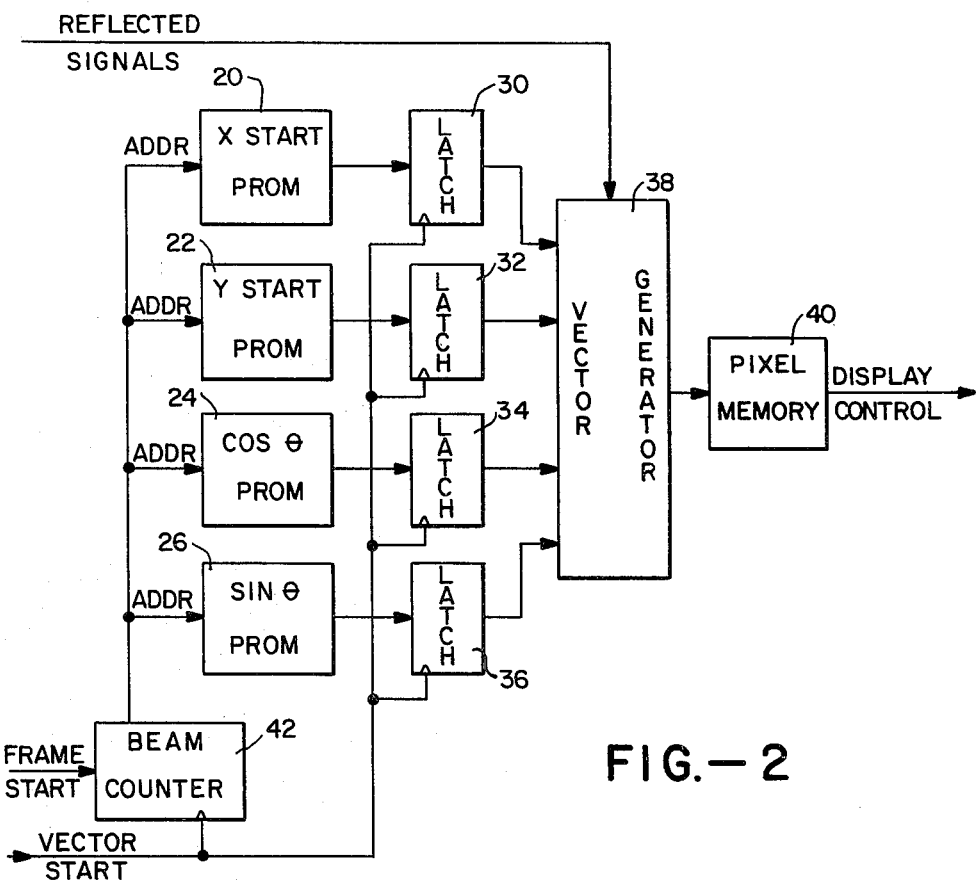
FIG.—2

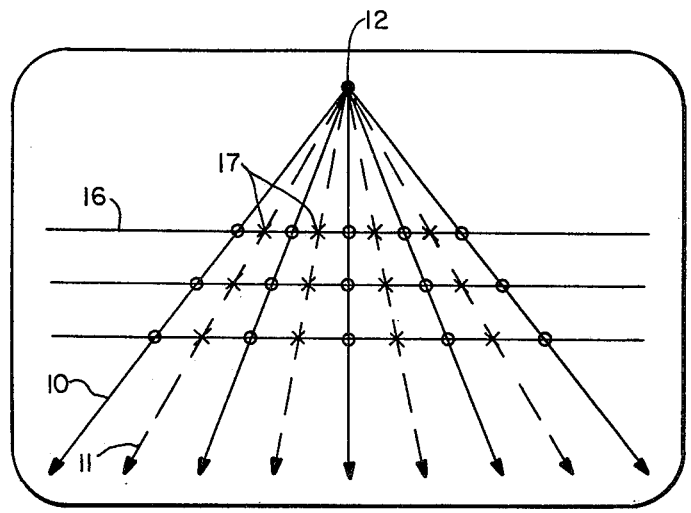
FIG.—3
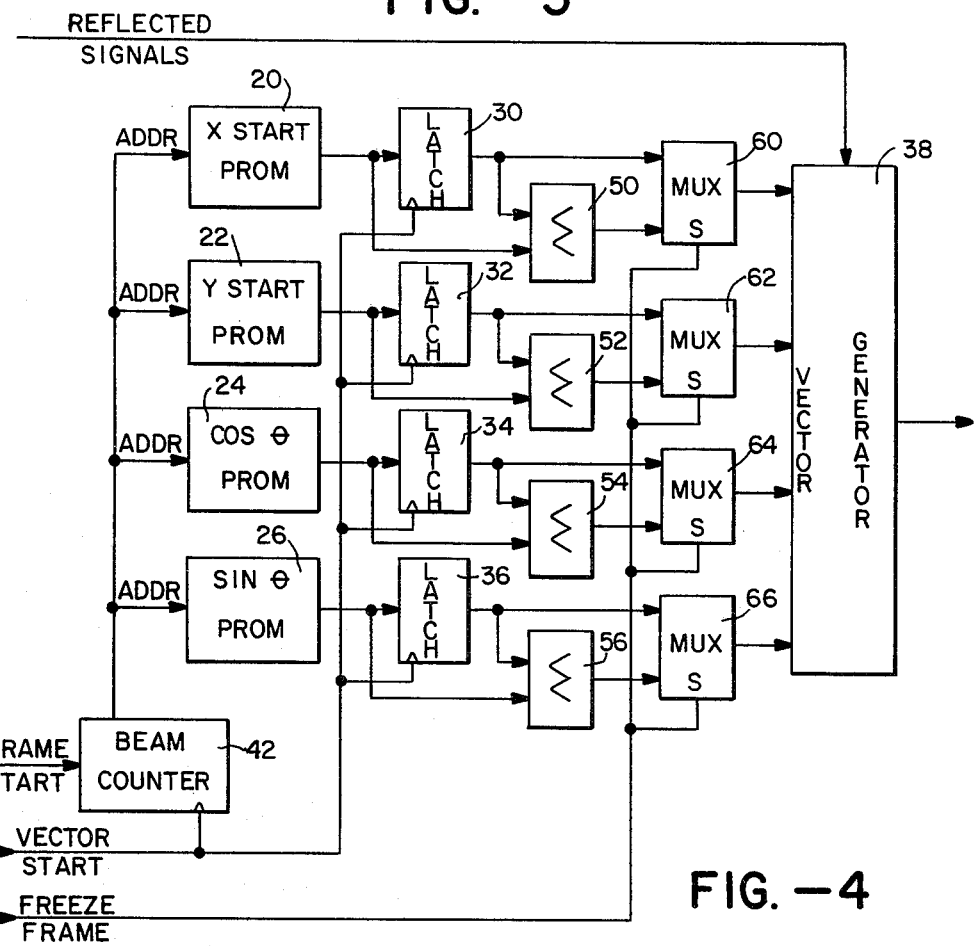
FIG.—4

METHOD AND MEANS FOR IMPROVING VIDEO DISPLAY IMAGE

This invention relates generally to video displays such as used in ultrasonic sector scanners, and more particularly the invention relates to a method and means for improving still-frame or frozen pictures in such video displays.

Ultrasonic scanning systems are known and commercially available for medical diagnostic purposes. See for example U.S. Pat. No. 4,172,386 for "Video A Trace Display System for Ultrasonic Diagnostic System" and U.S. Pat. No. 4,204,433 for "Computerized Ultrasonic Scanner With Technique Select". The commercially available Datason ultrasonic system of General Electric Company provides an A trace display along with both real time and static images on a television display.

Briefly, such systems utilize sound transducers to transmit ultrasonic (e.g. on the order of several megahertz) waves into a patient and to receive echo signals. In one mode of operation, the transducer is attached to a plurality of hinged arms for movement in a single plane, and potentiometers associated with the hinged arms produce signals which identify the transducer in position. Alternatively, a hand held sector transducer or a linear transducer array can be employed. The echo signals are applied to a variable gain amplifier to adjust the echo signals for attenuation when passing through the patient. The adjusted signals are then passed through an analog to digital conversion and video processing circuitry and thence either to a standard converter circuitry for controlling the body scan display or to sector scanner circuitry for graphically depicting the ultrasonic pulse echo. The digital data for controlling the display typically comprises five bits representing a 32 level Gray code of intensity.

With any real time ultrasonic image there are tradeoffs to consider between frame rate, line density, imaging depth, pixel update processing, and the like. All of these factors relate to image quality. If a real time image is chosen to have a certain number of beams, then based on the required depth the scan and other system parameters a certain frame rate can be determined. Generally, the number of beams should be maximized as well as the frame rate; however, these are mutually opposing requirements. A real time image will degrade when frozen because of the loss of frame integration by the eye. Therefore, a high line density is desirable particularly on a frozen image to increase the number of unique pixels in the image. However, if the number of image lines is increased to improve the freeze frame then the frame rate drops.

A general object of the present invention is a method and means of improving a still picture on a video display without degrading a real time image.

Another object of the invention is a method of increasing the number of video frames for a still picture while maintaining a desired frame rate for a real time picture.

Still another object of the invention is apparatus for use with digital ultrasonic sector scanners for improving the quality of a still picture.

Briefly, in accordance with the invention the quality of a still picture in a video display is improved by generating an additional video frame from vectors stored in memory but with the resultant vectors offset from the stored vectors by one-half vector. Consequently, the line density for a frozen image is doubled and the normal image degradation is reduced when a real time image is frozen.

Apparatus in accordance with the invention for generating pixel data for a second frame comprises means for generating a second plurality of vectors which are intermediate a first plurality of vectors for a first frame. More particularly, averaging means is provided for averaging the starting point and direction of successive vectors of the first plurality of vectors in deriving the second plurality of vectors. Both the first plurality of vectors and the second plurality of vectors are applied to the same input data in generating the first and second frames of the display.

The invention and objects and features thereof will be more readily apparent from the following detailed description and appended claims when taken with the drawing, in which:

FIG. 1 is an illustration of a display of an ultrasonic sector scanner.

FIG. 2 is a functional block diagram of conventional apparatus for generating pixel data in a display from vectors.

FIG. 3 is an illustration of a video display of an ultrasonic sector scanner in accordance with the present invention.

FIG. 4 is a functional block diagram of apparatus in accordance with the invention.

Referring now to the drawings, FIG. 1 is an illustration of a video display in an ultrasonic sector scanner. Typically, the scanner generates a pattern comprised of a plurality of vectors 10 emanating from a vertex 12 defined by the position of the transducer in the scanner. Data for the pixels 14 defined by crossing points of the vectors 10 and a display scan line 16 are generated in circuitry which responds to the starting position of each vector and the angle of inclination of the vector.

FIG. 2 is a functional block diagram of conventional circuitry for generating the pixel data for controlling a display in response to reflected signals for a plurality of vectors. One embodiment of such scan converter circuitry is disclosed in U.S. Pat. No. 4,236,221. As shown in FIG. 2, the start position for each vector is defined in an X start PROM 20 and a Y start PROM 22. The inclination of the vector is provided in a cosine data PROM 24 and a sine data PROM 26. The outputs of the PROMS 20-26 are applied through latches 30-36, respectively, to a vector generator 38 along with the reflected signals for the vectors, and data for pixels of a display are supplied to a memory 40 for use in controlling the electron beam in the video display. The PROMS 20-26 are addressed by beam counter 42 which is clocked at each vector start in determining the pixel data for each display frame.

As above described, for a dynamic real time image a certain number of beams and a frame rate are chosen depending on required depth of the scan. Generally the number of beams must be reduced as frame rate is increased, and in a dynamic image the frame rate is important. However, when a real time image is frozen, a degradation of the picture occurs due to the loss of frame integration by the observer's eye. Therefore, a higher line density is desirable to increase the number of unique pixels in the image.

In accordance with the present invention the number of pixels in a freeze frame is increased with a second display frame generated by writing the resultant vectors for the first frame offset by one-half vector. As illustrated in FIG. 3 the offset vectors 11 (shown by dotted line) generate data points 17 illustrated by x's on the horizontal scan line 16 of the video display. Accordingly, a more definite image of the frozen frame is presented.

FIG. 4 is a functional block diagram of apparatus for generating the freeze frame video display in accordance with the invention. The circuitry is similar to the circuity of FIG. 2 and like elements have the same reference numerals. However, summers 50, 52, 54, and 56 are interconnected to receive the outputs of the latches 30–36 and the PROMS 20–26, respectively, whereby the second frame can be generated. Thus, the first frame is generated as in FIG. 2, and then the second frame is provided by averaging the data for successive vectors which is then applied through MUX 60–66 to the vector generator 38 thereby generating the vectors 11 lying intermediate adjacent vectors of the first frame. The reflected signals for the first frame vectors are used again for the vectors of the second frame to generate the pixel data 17 as shown in FIG. 3.

In the normal operation when a dynamic image is being displayed the multiplexers are set to select the output of the latches 30–36 which generate the vectors described by the content of the PROMS when interfaced to vector generation circuit. When the offset frame for freeze is to be generated the multiplexers are set to select the output of the full adders. In this way the offset vectors are generated between the two normal vectors. In a sector scanner these vectors will overlap in the near field but in the far field where the vectors diverge new pixels will be written which will reduce the number of pixels which have to be filled artificially by other means.

Freeze frames generated by the method in accordance with the invention has proved successful in providing improved images. The apparatus is readily implemented in digital sector scanner apparatus such as the Datason system of General Electric Company. While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. In an ultrasonic sector scanner, a method of providing an improved frozen video display comprising the steps of generating first pixel data for a first frame from reflected ultrasonic data for a first plurality of vectors generated by said sector scanner, and generating second pixel data for a second frame from said reflected data for a second plurality of vectors lying intermediate said first plurality of vectors.

2. In an ultrasonic sector scanner in which pixel data for a display are generated from input data based on a plurality of vectors, apparatus for improving a freeze frame display comprising means for generating a second plurality of vectors which are intermediate said first plurality of vectors, and means for generating second pixel data for a second frame based on said second plurality of vectors and said reflected ultrasonic data.

3. Apparatus as defined by claim 2 wherein said means for generating a second plurality of vectors comprises means for averaging the start point and angle of inclination of adjacent vectors of said first plurality of vectors thereby obtaining vectors in said second plurality of vectors which lie intermediate adjacent vectors of said first plurality.

* * * * *